United States Patent
Chambert

(12) 
(10) Patent No.: US 6,679,633 B2
(45) Date of Patent: Jan. 20, 2004

(54) ASSEMBLY FORMING A ROLLER BEARING EQUIPPED WITH AN INFORMATION SENSOR DEVICE

(75) Inventor: Olivier Chambert, Lablachere (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 10/108,788

(22) Filed: Mar. 28, 2002

(65) Prior Publication Data

US 2002/0180619 A1 Dec. 5, 2002

(30) Foreign Application Priority Data

Mar. 28, 2001 (FR) .............................. 01 04178

(51) Int. Cl.[7] .......................... F16C 33/30; G01D 3/48
(52) U.S. Cl. ................................. 384/448; 324/207.25
(58) Field of Search ............................. 384/448, 544, 384/589; 324/173, 174, 207.22, 207.25

(56) References Cited

U.S. PATENT DOCUMENTS

| | | | |
|---|---|---|---|
| 4,978,234 A | * 12/1990 | Ouchi | ............... 384/448 |
| 4,986,605 A | 1/1991 | Descombes | |
| 4,988,219 A | 1/1991 | Peilloud | |
| 5,010,290 A | * 4/1991 | Foster | ............... 324/173 |
| 5,637,997 A | * 6/1997 | Hore et al. | ............... 324/207.16 |
| 6,363,799 B1 | * 4/2002 | Toda et al. | ............... 384/448 |

FOREIGN PATENT DOCUMENTS

| | | |
|---|---|---|
| EP | 0 498 299 | 10/1994 |
| WO | WO 98/58762 | 12/1998 |

OTHER PUBLICATIONS

Foster D A: "Development in Wheel Speed Sensing" ABS Traction Control, Detroit, Feb. 29–Mar. 4, 1988, International Congress and Exposition of the SAE, Warrendale, SAE, US, Feb. 29, 1988, pp. 39–45.

* cited by examiner

*Primary Examiner*—Thomas R. Hannon
(74) *Attorney, Agent, or Firm*—Michael Best & Friedrich LLP

(57) ABSTRACT

Assembly forming a roller bearing equipped with an information sensor device containing an encoder that generates magnetic pulses and a sensor equipped with at least two sensitive elements capable of detecting these pulses. The assembly comprises a fixed spindle containing an axial bore; a rotating external ring having, on the outside of the assembly, an annular housing that protrudes coaxially relative to said bore; and roller bodies arranged between spindle and external ring. The encoder is connected on one internal lateral face of a plug arranged in the housing and the sensor is arranged in the bore supported on an external lateral surface of the spindle.

11 Claims, 3 Drawing Sheets

ASSEMBLY FORMING A ROLLER BEARING EQUIPPED WITH AN INFORMATION SENSOR DEVICE

BACKGROUND

The invention concerns an assembly forming a roller bearing, equipped with an information sensor device, comprising a magnetic pulse generator-encoder connected to a rotating part and a fixed sensor equipped with at least two sensitive elements capable of detecting these pulses.

Such assemblies, when equipped with a rotational speed sensor device, angular position sensor and/or direction of rotation sensor, can be used, in particular, for the wheels of automotive vehicles provided with an anti-lock system for said wheels. The information is then used by a computer-assisted braking system.

Roller bearings equipped with an information sensor device are already known. One of the problems posed with such bearings is their protection with respect to pollution from the surrounding environment, especially protection of the encoder that generates the magnetic pulses read by the sensor.

In the case of an information sensor device of the electric type, document EP-0 498 299 proposes that this problem be solved by using a pair of shutters, on one of which a phonic wheel is associated.

However, in addition to the fact that this assembly is not transposable to a technology of the magnetic type, it presents the drawback of requiring numerous parts for its implementation. Moreover, the flux concentrator is associated with the fixed collar, which complicates assembly by not isolating the rolling stress measurement function.

In the case of an information sensor device of the magnetic type, document EP-0 326 454 proposes a roller bearing assembly comprising a disk carrying the encoder that rotates in front of a sensor connected to another disk.

This assembly has the drawback of prescribing that the disk carrying the sensor is used to axially block the internal collar, which requires adequate dimensioning and materials. Moreover, arrangement of the sensor on this rigid disk requires an additional assembly operation that must be conducted precisely to obtain proper control of the air gap. The result is that this assembly is difficult to accomplish at the production rates in force in the automotive industry.

SUMMARY

The invention seeks to remedy the drawbacks of the prior art by proposing an assembly that forms a roller bearing that is simple to assemble, while ensuring, on the one hand, effective protection of the bearing with respect to the surrounding environment and, on the other hand, proper control of the air gap. Moreover, the measurement function is totally dissociated from rolling stresses in the proposed assembly.

For this purpose, the invention proposes an assembly forming a roller bearing equipped with an information sensor device comprising a magnetic pulse generator-encoder and a sensor equipped with at least two sensitive elements capable of detecting these pulses, said assembly comprising:

a fixed spindle containing an axial bore;
 a rotating external ring having an annular housing on the outside of the assembly that protrudes coaxially relative to said bore; and roller bodies arranged between this spindle and external ring; in which, in combination:

the encoder is connected on one lateral internal face of a plug that is arranged in the housing;
 the sensor is arranged in the bore supported on an external lateral surface of the spindle, so that the sensitive elements are arranged facing each other and at a distance from the air gap of the encoder.

Other objects and advantages of the invention will be apparent in the following description, with reference to the appended drawings, in which

DETAILED DESCRIPTION OF THE PREFERRED EMBODIMENTS

Figure 1:
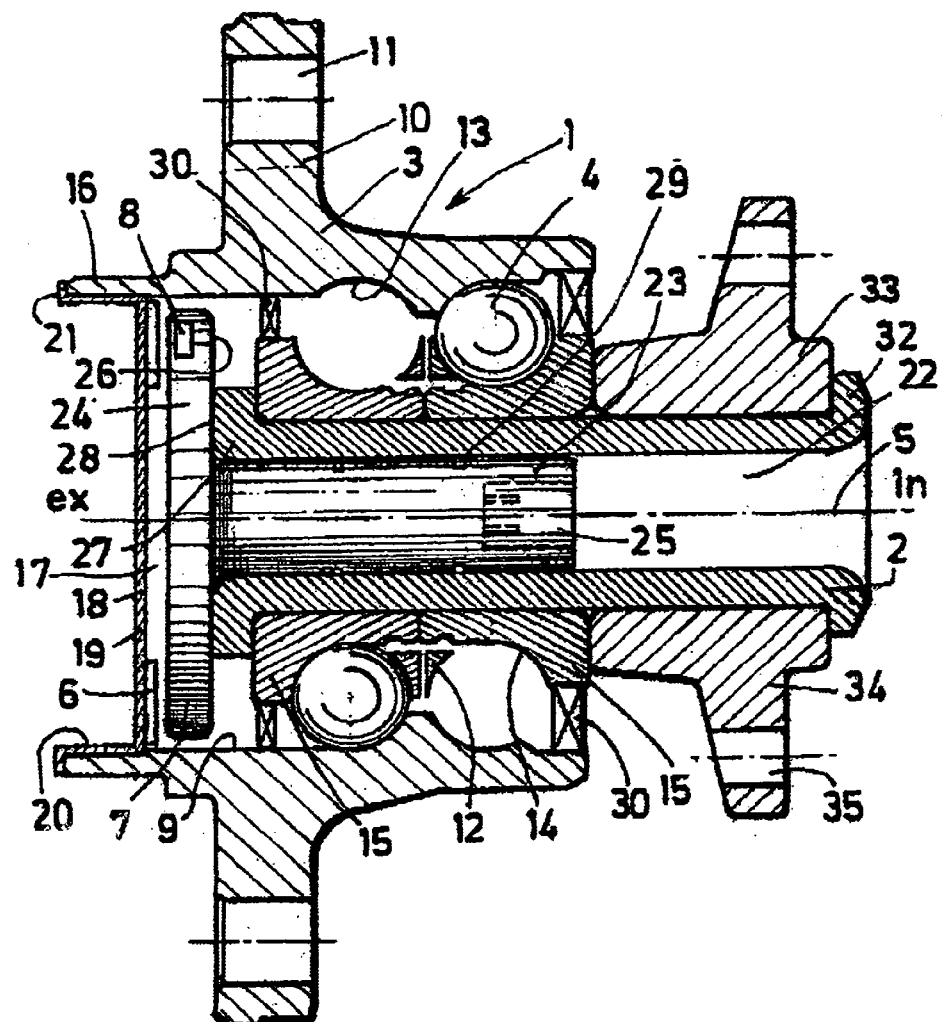
FIG. 1 shows, in a longitudinal section, an assembly forming a roller bearing according to a first variant.
Figure 2:
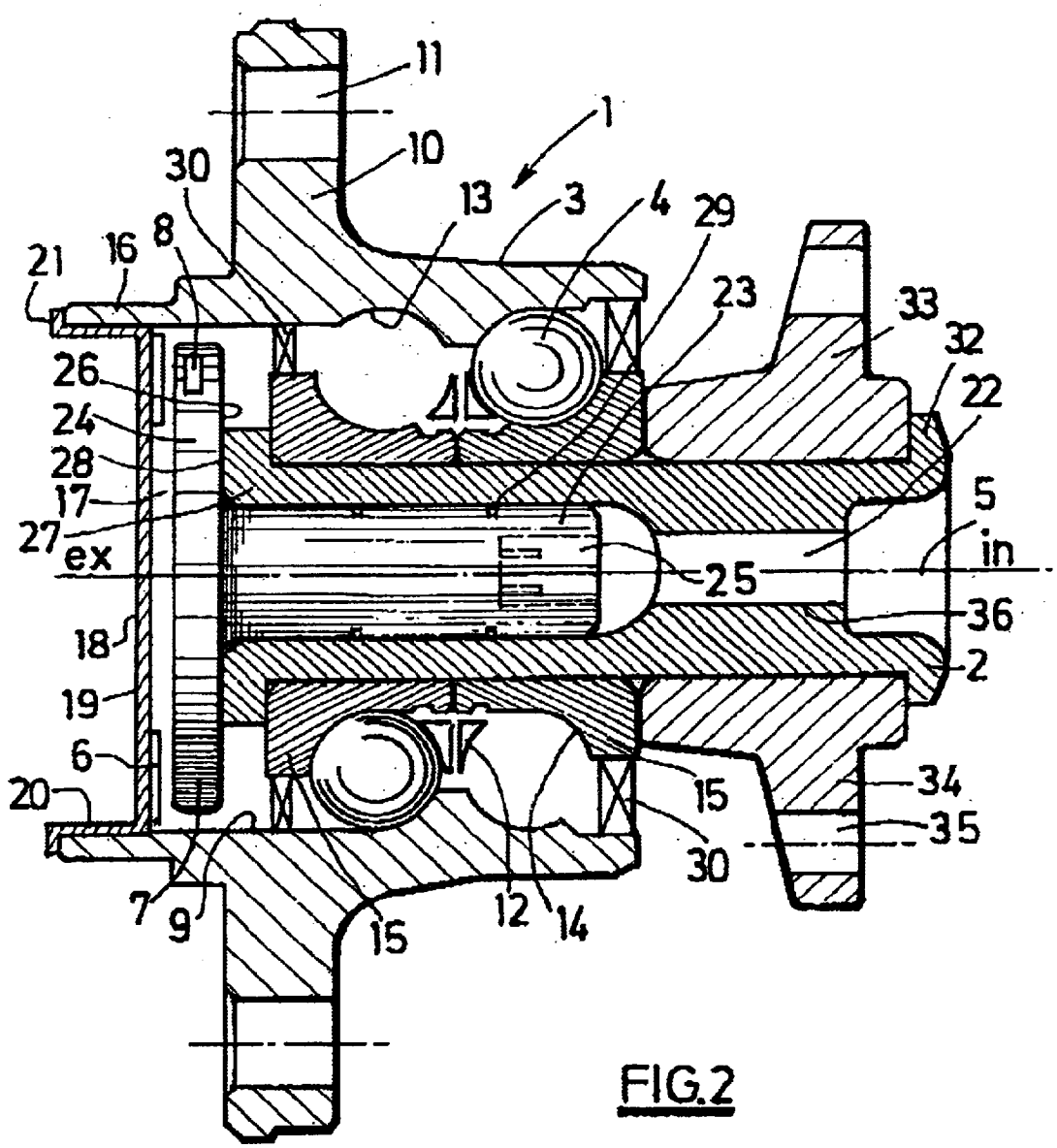
FIG. 2 shows, in a longitudinal section, an assembly forming a roller bearing according to a second bearing.
Figure 3:
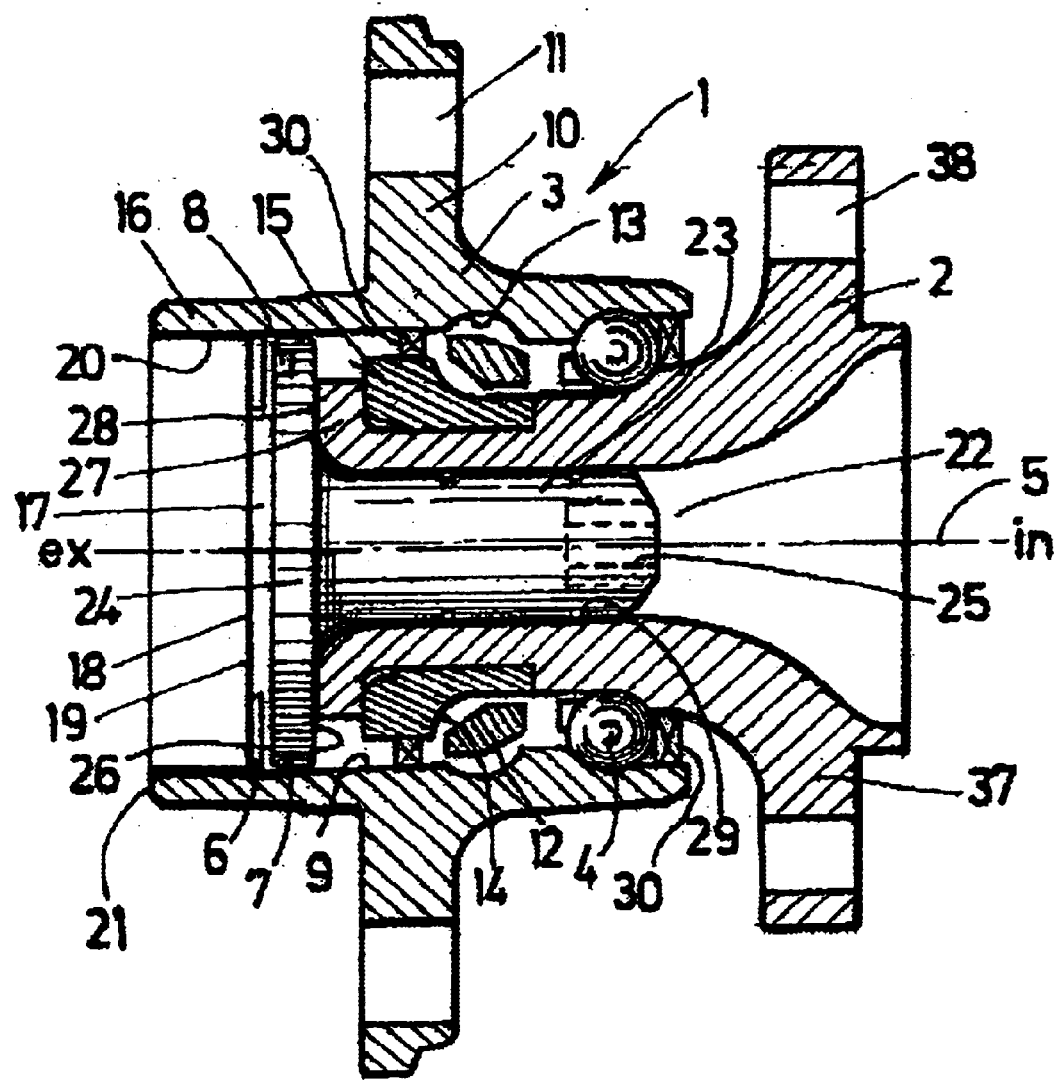
FIG. 3 shows, in a longitudinal section, an assembly forming a roller bearing according to a third variant.

An assembly, comprising a roller bearing 1 containing a fixed spindle 2, a rotating external ring 3 and roller bodies 4 arranged between them, in order to permit relative rotation of these two parts 2, 3 around an axis 5, is shown in FIGS. 1 to 3. A bearing of the type shown in FIGS. 1 and 2 is described, for example, in Application FR-00 09176 from the applicant.

When one wishes to know rotational speed, the direction of displacement and/or angular position of the rotating ring 3 relative to spindle 2, it is known that an information sensor device can be used that contains a magnetic pulse generator-encoder 6 connected to the rotating ring 3 and, connected to spindle 2, a sensor 7 equipped with at least two sensitive elements 8 capable of detecting these pulses.

In the description, the terms "upper" and "lower" are defined relative to an plane opposite and facing axis 5, respectively, the terms "axial" or "transversal" are defined relative to a plane parallel to axis 5, the terms "radial" or "lateral" are defined relative to a plane perpendicular to axis 5.

The rotating ring 3 comprises a bore 9 and a flange 10 designed to permit connection of a brake disk and a wheel rim of an automotive vehicle (not shown) on said rotating ring 3. For this purpose, the flange 10 is provided with attachment holes 11 distributed circumferentially on its surface so as to make the connection by means of screws or bolts.

In the variants shown in the figures, rolling is ensured by two rows of balls 4 kept equidistant by cages 12.

However, and as a function of use constraints, one can prescribe the use of a different number of rows of balls 4 and/or the use of different roller bodies 4, for example, in the form of rollers or needles.

To receive the balls 3, two ball races 13 are made on the surface of the bore. These two races 13 are offset axially relative to flange 10, in order to facilitate making of the ring 3, while ensuring better mechanical strength.

Moreover, in the variants depicted in FIGS. 1 and 2, each row of balls 4 rolls on a ball race 14 made on the upper transversal surface of an internal fixed ring 15.

As will be described subsequently, the two internal rings 15 are mounted on the upper surface of spindle 2 with ball races 13, 14 arranged facing them.

Although the variant described above avoids machining of ball races 14 directly on the upper surface of spindle 2, one can provide a bearing 1 devoid of the internal ring 15, in order to limit the number of parts to be assembled.

In the variant depicted in FIG. 3, the bearing comprises an internal ring 15 and the ball race of the second row of balls machined directly on the upper surface of spindle 2.

The rotating ring 3 also contains an annular axial protrusion 16 that extends from the external side of the assembly, in order to form a coaxial housing 17 that communicates with bore 9.

The terms "external" and "internal" in the description are defined relative to the indices ex and in placed on the figures, i.e., relative to the side situated toward the exterior and toward the interior of the vehicle, respectively.

As is apparent in the figures, the axial space requirement of this housing 17 is relatively limited, which permits a compact assembly to be obtained.

The housing 17 is intended to receive, for example, by mounting or the like, a plug 18, whose function, on the one hand, is to carry the encoder 6 and, on the other hand, to avoid contamination of the assembly by external pollutants (water, mud, etc.).

In a particular example, the encoder 6 is formed from a multipole ring made of synthetic material filled with ferrite particles formed from a number of domains adjacent to the inverted magnetization direction of a given domain relative to the two domains adjacent to it.

According to one variant, the plug 18 contains a solid disk 19 carrying encoder 6, an axial cylindrical support 20 with a diameter essentially identical to that of housing 17 and an annular shoulder 21 that extends radially from said support 20.

Thus, connection of encoder 6, because it is made on a plane surface, is easy to accomplish, for example, by gluing.

Moreover, the cylindrical support 20 permits force-fitting of plug 18 on the external ring 3. This assembly, on the one hand, ensures tightness and, on the other hand, rotation of encoder 6 together with external ring 3.

Moreover, plug 18 can be made in monoblock fashion, for example, by cutting of a sheet or molding of a polymer material, without the constraint of high mechanical strength, since it is not subject to rolling forces.

The shoulder 21, abutting the end of the external ring 3, permits precise positioning of encoder 6 in a specified radial plane.

The arrangement of the sensitive elements 8 of sensor 7 facing each other and at a distance from the air gap of this radial plane are described below.

In a particular example, the sensor 7 contains at least two sensitive elements 8, for example, a number of aligned sensitive elements 8 that are chosen among Hall-effect sensors, magnetoresistors, and giant magnetoresistors. In known fashion, such elements 8 are capable of detecting the magnetic pulse generated by encoder 6.

The spindle 2 contains an axial bore 22 intended to receive sensor 7 of a sensor device of information, like rotational speed, direction of rotation and/or angular position of the rotating ring 3 relative to the fixed spindle 2.

This type of information, after electronic treatment, is conventionally used in the antilock systems of wheels or other systems for driving assistance.

The shape and size of bore 22 are designed to permit arrangement of sensor 7, especially with the upper transverse faces of sensor 7 in contact with the surface of bore 22.

In the variants shown in the figures, the bore 22 is cylindrical and the sensor 7 contains a cylindrical base part 23, in order to permit its adjustment within bore 22.

The sensor 7 also contains an end part 24 coaxial to the roller bearing, which is made in the form of a solid disk that protrudes radially from base part 23.

In a particular example, the sensor 7 is made in monoblock fashion and moldable, for example, by molding of a plastic material, with means of connection 25 of said sensor 7 arranged in the base part 23 and the sensitive elements 8 arranged near the external periphery of the end part 24.

In effect, the sensor 7 is not subject to any rolling force and can be made without the constraint of high mechanical strength.

In this variant, the internal face 26 of disk 24 abuts the external lateral surface of spindle 2, in order to ensure precise positioning of the sensitive elements 8 relative to encoder 6.

In particular, and to further improve the precision of positioning, the external end of spindle 2 contains an annular shoulder 27.

In the variants depicted in FIGS. 1 and 2, the shoulder 27 is made by machining of the spindle, and its external lateral face 28 is also machined to receive disk 24.

This variant, on the one hand, permits an increase in size of the support surface 28 to improve stability of sensor 7 and, on the other hand, precise machining of said surface 28 so as to increase the precision of positioning of the sensitive elements 8 in a radial plane situated at a distance from the air gap of encoder 6.

In the variant shown in FIG. 3, the shoulder 27 is made by embossing of the material so as to avoid the later stage of machining of its external lateral face, while preserving good precision of positioning of the sensitive elements 8 in a radial plane situated at a distance from the air gap of encoder 6.

Moreover, since the base part 23 extends into bore 22 with means of connection 25 arranged opposite the end part 24, one can easily recover the information furnished by sensor 7 toward the interior of the vehicle.

Moreover, the arrangement of sensor 7 in bore 22 at a relatively substantial distance permits precise centering of the sensitive elements 8 relative to the axis of rotation of bearing 1.

It is apparent from the above description that, by combining the thickness of disk 24 and the length of support 20, one can simply and very precisely adjust the air gap as a function of geometry of bearing 1.

Moreover, the assembly permits optimal sealing for bearing 1.

As described above, the plug 18 permits isolation of bearing 1 from the exterior of the assembly.

But the sensor 7 also has a sealing function since, by blocking bore 22, it isolates the bearing 1 from pollutants coming from the interior. To improve this sealing, toric joints 29 can be arranged on the surface of base part 23. Moreover, these joints 29 permit an improvement in holding of the sensor 7 within bore 22.

The bearing 1 also contains its own means of sealing, which are formed on the inside and outside by a joint 30 arranged between external ring 3 and an internal ring 15, respectively (FIGS. 1 and 2).

In the variant of FIG. 3, a joint 30 is arranged between the external ring 3 and the spindle 2, and a second joint 30 is arranged between the external ring 3 and the internal ring 15.

Thus, since the information sensor device is protected from grease, it is not necessary to make sensor 7 and/or encoder 6 from materials compatible with said grease.

In the variants shown in FIGS. 1 and 2, the inside of spindle 2 contains a radial annular shoulder 32 formed, for example, by embossing of the material. The shoulder 32 is made to permit unremovable axial blocking of the two internal rings 15 and a fixed support 33 between the two shoulders 27, 32.

This shoulder 32 is offset axially from rings 15, 3 of the roller bearing, in order to limit repercussions due to the recoil forces of the material.

The fixed support 33 contains a flange 34 provided with attachment holes 35 made to ensure fixation of the assembly by screwing or bolting, for example, on a suspension element of an automotive vehicle.

In the variant shown in FIG. 1, the diameter of bore 22 is essentially constant over its entire length. This tubular structure also permits a non-negligible gain in weight for the assembly.

In the variant shown in FIG. 2, a reinforcement 36 that locally reduces the diameter of axial bore 22 is provided beneath fixed support 33, in order to rigidify spindle 2, while retaining low weight.

In the variant shown in FIG. 3, the spindle 2 is made in a single piece and integrated with a flange 37 provided with attachment holes 38 made to ensure attachment of the assembly by screwing or bolting, for example, on a suspension element of an automotive vehicle.

The assembly just described is called "ready for use" in that it possesses these functional characteristics, especially in terms of functional play and contact angle, as soon as it leaves the manufacturing lines, and, in particular, no adjustment is required during mounting on the vehicle.

Moreover, by using a limited number of parts and permitting the information sensor device to be made without allowing for rolling forces, it permits combining optimal sealing with precise control of the air gap.

What is claimed is:

1. Assembly forming a roller bearing equipped with an information sensor device containing an encoder that generates magnetic pulses and a sensor equipped with at least two sensitive elements capable of detecting these pulses, said assembly comprising:

a fixed spindle containing an axial bore;

a rotating external ring having, on the outside of the assembly, an annular housing that protrudes coaxially relative to said bore; and roller bodies arranged between the spindle and the external ring;

said assembly being characterized by the fact that, in combination:

the encoder is connected on an internal lateral face of a plug arranged in the annular housing; and the sensor is arranged in the spindle axial bore and is supported on an external lateral surface of the spindle such that the sensitive elements are supported facing toward and at a distance from the encoder such that there is an air gap between the sensitive elements and the encoder.

2. Assembly according to claim 1, characterized by the fact that the external end of the spindle contains a radial annular shoulder.

3. Assembly according to claim 2, characterized by the fact that an internal end of the spindle contains a radial annular shoulder, and by the fact that a fixed support and at least one internal fixed ring is mounted on the spindle between the two shoulders.

4. Assembly according to claim 3, characterized by the fact that a reinforcement that locally reduces the diameter of the spindle axial bore is provided beneath the fixed support so as to rigidify spindle.

5. Assembly according to claim 1, characterized by the fact that the sensor contains a base part, whose shape and size permit adjustment of said base part within the spindle axial bore, and an end part in the form of a disk that protrudes radially from said base part.

6. Assembly according to claim 5, characterized by the fact that the sensor is made in monoblock fashion with means of connection of said sensor arranged in the base part and the sensitive elements arranged in the vicinity of the external periphery of the end part.

7. Assembly according to claim 5, characterized by the fact that toric joints are arranged on the surface of the base part to ensure tightness of the sensor with respect to the spindle axial bore.

8. Assembly according to claim 1, characterized by the fact that the plug is monoblock and contains a solid disk carrying the encoder, an axial cylindrical support with a diameter essentially identical to that of the housing and an annular shoulder that extends radially from said support.

9. Assembly according to claim 1, characterized by the fact that the sensitive elements are chosen from Hall-effect sensors, magnetoresistors, and giant magnetoresistors.

10. Assembly according to claim 1, characterized by the fact that the encoder is formed from a multipole ring made of synthetic material filled with ferrite particles formed from a number of domains adjacent to the inverted direction of magnetization of a given domain relative to the two domains adjacent to it.

11. Assembly according to claim 1, characterized by the fact that the spindle is monoblock and integrated with means of attachment of the assembly.

* * * * *